United States Patent
Lamkin et al.

(10) Patent No.: US 7,191,442 B2
(45) Date of Patent: Mar. 13, 2007

(54) BCA WRITER SERIALIZATION MANAGEMENT

(75) Inventors: Allan B. Lamkin, San Diego, CA (US); Jeff G. Blair, San Jose, CA (US); Todd R. Collart, Los Altos, CA (US)

(73) Assignee: Research Investment Network, Inc., Long Beach, CA (US)

( * ) Notice: Subject to any disclaimer, the term of this patent is extended or adjusted under 35 U.S.C. 154(b) by 852 days.

(21) Appl. No.: 10/003,704

(22) Filed: Oct. 30, 2001

(65) Prior Publication Data

US 2002/0169520 A1 Nov. 14, 2002

Related U.S. Application Data

(60) Provisional application No. 60/244,558, filed on Oct. 30, 2000.

(51) Int. Cl.
  *G06F 9/46* (2006.01)
  *G06F 15/16* (2006.01)
  *G06F 12/00* (2006.01)
(52) U.S. Cl. .................. 718/100; 709/234; 711/158
(58) Field of Classification Search ............... 709/234, 709/229; 718/101, 100; 711/158
See application file for complete search history.

(56) References Cited

U.S. PATENT DOCUMENTS

| | | | |
|---|---|---|---|
| 4,658,093 A | 4/1987 | Hellman | |
| 4,709,813 A | 12/1987 | Wildt | |
| 4,710,754 A | 12/1987 | Montean | |
| 4,967,185 A | 10/1990 | Montean | |
| 4,974,197 A | * 11/1990 | Blount et al. ............... | 709/234 |
| 5,023,907 A | 6/1991 | Johnson et al. | |
| 5,128,752 A | 7/1992 | Von Kohorn | |
| 5,305,195 A | 4/1994 | Murphy | |
| 5,305,197 A | 4/1994 | Axler et al. | |
| 5,347,508 A | 9/1994 | Montbriand et al. | |

(Continued)

FOREIGN PATENT DOCUMENTS

EP 372716 6/1990

(Continued)

OTHER PUBLICATIONS

Active Video Watching Using Annotation, by Nuno Correla and Teres Chambel, ACM Digital Library, International Multimedia Conference, Oct. 30-Nov. 5, 1999, in Orlando, Florida.

(Continued)

*Primary Examiner*—Meng-Al T. An
*Assistant Examiner*—Camquy Truong
(74) *Attorney, Agent, or Firm*—Steve A. Wong; Caroline T. Do

(57) ABSTRACT

A serialization management system consists of a job control host for assigning serial numbers to storage media, and for generating a job; a replication facility host communicatively coupled to the job control host, wherein the job control host communicates the job to the replication facility host; and a serialization writer communicatively coupled to the replication facility host, wherein the replication facility host controls the serialization writer in response to the job, and communicates status information to the job control host. In another embodiment, the invention can be characterized as method for operating the serialization management system.

12 Claims, 12 Drawing Sheets

U.S. PATENT DOCUMENTS

| | | | |
|---|---|---|---|
| 5,353,218 A | 10/1994 | De Lapa et al. | |
| 5,410,343 A | 4/1995 | Coddington et al. | |
| 5,413,383 A | 5/1995 | Laurash et al. | |
| 5,420,403 A | 5/1995 | Allum et al. | |
| 5,483,658 A | 1/1996 | Grube et al. | |
| 5,509,074 A | 4/1996 | Choudhury et al. | |
| 5,568,275 A | 10/1996 | Norton et al. | |
| 5,651,064 A | 7/1997 | Newell | |
| 5,673,195 A | 9/1997 | Schwartz et al. | |
| 5,696,898 A | 12/1997 | Baker et al. | |
| 5,734,719 A | 3/1998 | Tsevdos et al. | |
| 5,751,672 A | 5/1998 | Yankowski | |
| 5,777,305 A | 7/1998 | Smith et al. | 235/380 |
| 5,802,294 A | 9/1998 | Ludwig et al. | |
| 5,804,810 A | 9/1998 | Woolley et al. | |
| 5,812,661 A | 9/1998 | Akiyama et al. | |
| 5,822,291 A | 10/1998 | Brindze et al. | |
| 5,857,021 A | 1/1999 | Kataoka et al. | |
| 5,860,068 A | 1/1999 | Cook | |
| 5,869,819 A | 2/1999 | Knowles et al. | |
| 5,878,020 A | 3/1999 | Takahashi | |
| 5,892,825 A | 4/1999 | Mages et al. | |
| 5,892,900 A | 4/1999 | Ginter et al. | |
| 5,892,908 A | 4/1999 | Hughes et al. | |
| 5,893,910 A | 4/1999 | Martineau et al. | |
| 5,895,073 A | 4/1999 | Moore | |
| 5,899,980 A | 5/1999 | Wilf et al. | |
| 5,905,798 A | 5/1999 | Nerlikar et al. | |
| 5,913,210 A | 6/1999 | Call | |
| 5,915,093 A | 6/1999 | Berlin et al. | |
| 5,920,694 A | 7/1999 | Carleton et al. | |
| 5,930,238 A | 7/1999 | Nguyen | |
| 5,930,767 A | 7/1999 | Reber et al. | |
| 5,940,504 A | 8/1999 | Griswold | |
| 5,950,173 A | 9/1999 | Perkowski | |
| 5,960,398 A | 9/1999 | Fuchigami et al. | |
| 5,978,773 A | 11/1999 | Hudetz et al. | |
| 5,987,464 A | 11/1999 | Schneider | |
| 5,987,525 A | 11/1999 | Roberts et al. | |
| 5,991,798 A | 11/1999 | Ozaki et al. | |
| 6,006,328 A | 12/1999 | Drake | |
| 6,009,410 A | 12/1999 | LeMole et al. | |
| 6,012,071 A | 1/2000 | Krishna et al. | |
| 6,016,166 A | 1/2000 | Huang et al. | |
| 6,018,678 A | 1/2000 | Ullman et al. | |
| 6,025,780 A | 2/2000 | Bowers et al. | |
| 6,034,937 A | 3/2000 | Kumagai | |
| 6,035,329 A | 3/2000 | Mages et al. | |
| 6,044,403 A | 3/2000 | Gerszberg et al. | |
| 6,055,314 A | 4/2000 | Spies et al. | |
| 6,061,057 A | 5/2000 | Knowlton et al. | |
| 6,064,979 A | 5/2000 | Perkowski | |
| 6,070,171 A | 5/2000 | Snyder et al. | 707/203 |
| 6,073,124 A | 6/2000 | Krishnan et al. | |
| 6,076,733 A | 6/2000 | Wilz, Sr. et al. | |
| 6,081,785 A | 6/2000 | Oshima et al. | |
| 6,097,291 A | 8/2000 | Tsai et al. | |
| 6,097,814 A | 8/2000 | Mochizuki | |
| 6,101,180 A | 8/2000 | Donahue et al. | |
| 6,128,649 A | 10/2000 | Smith et al. | |
| 6,128,652 A | 10/2000 | Toh et al. | |
| 6,134,593 A | 10/2000 | Alexander et al. | |
| 6,154,738 A | 11/2000 | Call | |
| 6,154,773 A | 11/2000 | Roberts et al. | |
| 6,161,132 A | 12/2000 | Roberts et al. | |
| 6,182,222 B1 | 1/2001 | Oparaji | |
| 6,198,875 B1 | 3/2001 | Edenson et al. | |
| 6,199,048 B1 | 3/2001 | Hudetz et al. | |
| 6,208,805 B1 | 3/2001 | Abecassis | |
| 6,226,235 B1 | 5/2001 | Wehmeyer | |
| 6,246,778 B1 | 6/2001 | Moore | |
| 6,272,606 B1 * | 8/2001 | Dorricott et al. | 711/158 |
| 6,289,452 B1 | 9/2001 | Arnold et al. | 713/175 |
| 6,298,332 B1 | 10/2001 | Montague | |

FOREIGN PATENT DOCUMENTS

| | | |
|---|---|---|
| EP | 762422 | 8/1996 |
| EP | 809244 | 11/1997 |
| EP | 814419 | 12/1997 |
| EP | 849734 | 6/1998 |
| EP | 853315 | 7/1998 |
| EP | 984346 | 3/2000 |
| EP | 802527 | 8/2001 |
| GB | 2314658 | 1/1998 |
| JP | 10063562 | 6/1998 |
| JP | 11039262 | 2/1999 |
| JP | 2000059824 | 2/2000 |
| WO | 88/02960 | 4/1988 |
| WO | 98/58368 | 12/1998 |
| WO | 99/02385 | 1/1999 |
| WO | 99/08855 | 2/1999 |
| WO | 99/14678 | 3/1999 |
| WO | 99/18054 | 4/1999 |
| WO | 99/24192 | 5/1999 |
| WO | 98/47080 | 10/1999 |
| WO | 00/16229 | 3/2000 |

OTHER PUBLICATIONS

No Modem Needed: TV Signals Bring the Web to Your PC by Michael S. Lasky, Computing Storypage, CNN IDG.net, May 21, 1998.

Mascha M et al: "Interactive education: Transitioning CD-ROMS to the Web "Computer Networks and ISDN Systems, NL, North Holland Publishing, Amsterdam, vol. 27, No. 2, Nov. 1, 1994, pp. 267-272.

* cited by examiner

BCA WRITER SERIALIZATION MANAGEMENT

This patent document claims priority under 35 U.S.C. § 119(e) to U.S. Provisional Patent Application Ser. No. 60/244,558, filed Oct. 30, 2000, for ARCHITECTURE FOR A BCA WRITER SYSTEM, the entirety of which is hereby incorporated by reference.

SUMMARY OF THE INVENTION

The present invention advantageously provides a serialization management system and method.

In one embodiment, the invention can be characterized as a serialization management system employing a job control host for assigning serial numbers to storage media, and for generating a job; a replication facility host communicatively coupled to the job control host, wherein the job control host communicates the job to the replication facility host; and a serialization writer communicatively coupled to the replication facility host, wherein the replication facility host controls the serialization writer in response to the job, and communicates status information to the job control host.

In a variation of this embodiment, a serialization writer console is coupled to the serialization writer, the serialization writer console prompting the replication facility host for a batch by communicating a batch request to the replication facility host; wherein the replication facility host communicates to the serialization writer, in response to the batch request, batch data, the batch data being generated by the replication facility host as a function of the job.

In another embodiment, the invention can be characterized as a serialization management method having steps of assigning serial numbers to storage media in a job control host; generating a job in the job control host; communicating the job to a replication facility host; controlling a serialization writer in response to the job; and communicating status information to the job control host.

In a variation of this method, such method has the further step of prompting the replication facility host for a batch by communicating a batch request to the replication facility host; generating batch data at the replication facility host as a function of the job; and communicating to the serialization writer, in response to the batch request, the batch data.

In another variation of this method, such method has the additional steps of writing serialization onto media with the serialization writer in response to the batch data.

In yet a further variation of this method, such method has the further additional steps of receiving a job complete indicia at a replication facility console; communicating the job complete indicia to the replication facility host; generating a job complete status in the replication facility host in response to the job complete indicia; and communicating the job complete status to the job control host.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
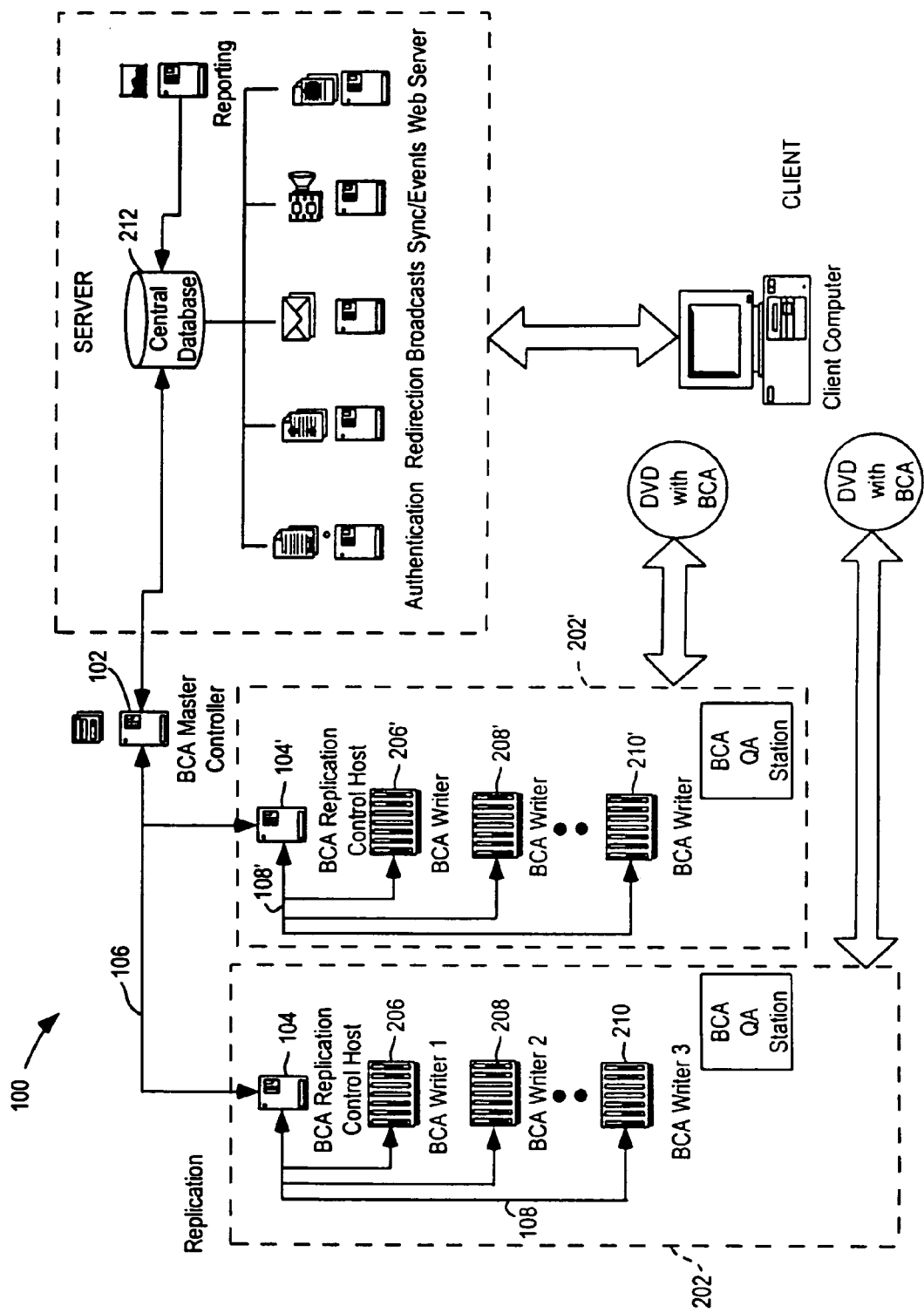
FIG. 1 is hardware block diagram of a BCA writer serialization management system in accordance with one embodiment of the present invention.
Figure 2:
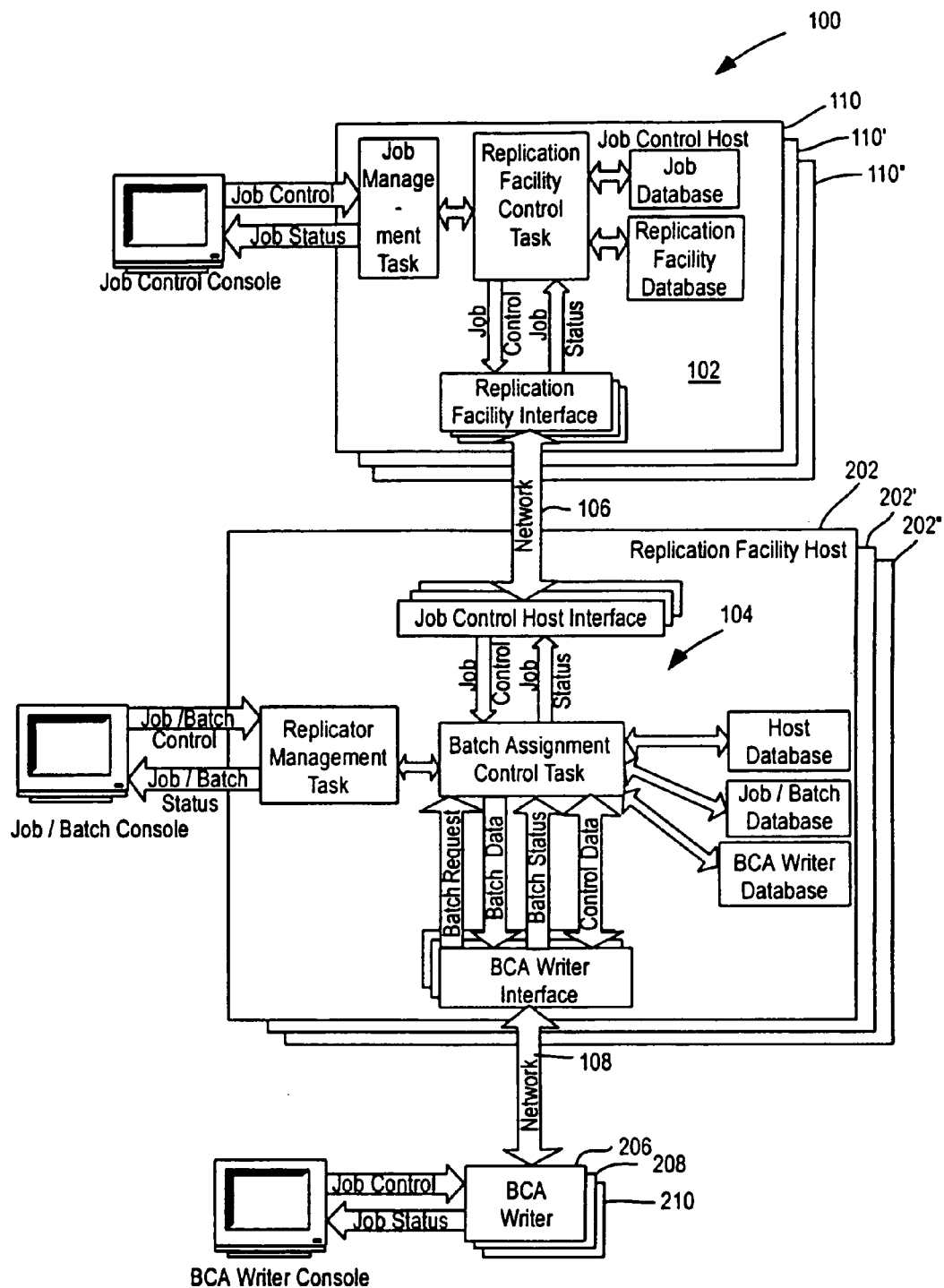
FIG. 2 is a functional block diagram of a BCA writer serialization management system, such as in FIG. 1, in accordance with the one embodiment.

Referring to FIG. 1, a hardware block diagram is shown of a serialization writer, e.g., a BCA writer, serialization management system 100 in accordance with one embodiment, and, simultaneously referring to FIG. 2, a functional block diagram is shown of a BCA writer serialization management system 100, such as in FIG. 1, in accordance with the one embodiment.

The present embodiment is directed to a turnkey serialization and control system for use within multiple replication facilities 202, 202', 202", such as DVD or other media replication facilities that can control multiple serialization writers, such as BCA writers. The serialization and control system employs a master control host 102 for receipt and transmission of serialization information.

Serialization writers 206, 208, 210, 206', 208', 210', e.g., BCA writers of various manufacturers are preferably supported, and the serialization and control system is preferably scalable to multiple replication facilities 202, 202', 204', and multiple serialization writers 206, 208, 210, 206', 208', 210', e.g., BCA writers, per replication facility.

The serialization and control system can be controlled from the master control host 102. The master control host 102 automatically updates a central database 212 during BCA writing, and the central database 212 can be used, for example, for authentication and tracking of serialized media.

Work orders can be spread across multiple replication facilities 202, 202', 202" and serialization writers 206, 208, 210, 206', 208', 210', e.g., BCA writers, within a replication facility.

In accordance with the present embodiment, the serialization writers 206, 208, 210, 206', 208', 210' also perform verification of serialization information, e.g., the BCA numbers, having been written. The central database 212 is updated to reflect whether a BCA number is read during verification, or whether a read attempt during verification fails. The BCA number written to media for which verification fails is not used on any other media, which helps to prevent/detect piracy since no number can be used twice.

The serialization and control system also supports double sided media, and allows for a BCA number to be applied to each side of the double sided media, such as double sided a DVD disc, so that the side of the media that is accessed, e.g., played, can be tracked. The writing of the BCA numbers to double sided media is effected by offsetting the laser on each side media so as to burn down through the media and not interfere with the BCA number on the other side of the media. Two different BCA numbers are applied to each side of the media.

The serialization and control system of the present embodiment includes: a master control host 102 comprising a control server, such as an Intel-based personal computer, at a central location, connected and interfaced with (such as through a network 106, such as a TCP/IP based Ethernet network) individual replication control hosts 104, 104' at multiple replication facilities 202, 202', 202", and employing an operating system, such as Windows NT/2000 from Microsoft of Washington, U.S.A.; and a replication control host 104, 104' comprising a multi-processor control host, such as a multi-processor Intel-based personal computer, at a replication facility 202, 202', 202", connected and interfaced with (such as through a network 108, such as a TCP/IP based Ethernet network) individual BCA writers 206, 208, 210, 206', 208', 210' at the replication facility, and employing an operating system, such as Linux, an open-source operating system.

Note that in an alternative embodiment, where, for example, only a single replication facility is used, the job control host and the replication facility host may be implemented on a single personal computer.

Thus, the serialization and control system of the present embodiment includes two major subsystems. The first subsystem (the replication control hosts 104, 104') resides at a replication facility 202, 202', 202" and manages the application of specific data sets ("serial numbers") to media, such as DVD discs. The second subsystem (the master control host 102) resides at a centralized facility 110, 110', 110" and manages the creation of serial number sets and their assignment to specification replication facilities. A replication control host 202, 202', 202" (or replication facility host 202, 202', 202") can take job sets from multiple master control hosts 102 (or job control hosts 102), and similarly a job control host 102 can provide data sets to multiple replication facility hosts 104, 104'.

The serialization and control system further includes (or is coupled to) one or more serialization writers 206, 208, 210, 206', 208', 210', such as BCA writers 206, 208, 210, 206', 208', 210', at the replication facility 202, 202', 202".

Referring to FIGS. 1 and 2, a block diagram is shown illustrating a high-level system architecture for a serialization and control system.

The serialization and control system includes three main components:

1. The Job Control Host 102—A centralized system that creates and manages batches of serial numbers (jobs). The jobs are assigned to specific replication facilities 202, 202', 202". The job control host 102 manages the assignment, transmission, and tracking of jobs to any number of replication facilities 202, 202', 202". The job control host is typically owned and managed by or for a content owner producing media, such as discs.

2. The Replication Facility Host 104, 104'—A system that resides within a specific replication facility 202, 202', 202" and manages the application of the serial number batches (jobs) to actual DVD discs. The jobs may be assigned by any number of job control hosts. The replication facility host 104, 104' communicates and inter-operates with one or more BCA writers 206, 208, 210, 206', 208', 210' within the replication facility 202, 202', 202" to accomplish this task. The replication facility host 104, 104' should preferably be a high availability system as its failure will cause all attached serialization writers 206, 208, 210, 206', 208', 210' to be unusable. The replication control host 104, 104' manages workload amongst the serialization writers 206, 208, 210, 206', 208', 210' at the replication facility, including splitting work orders amongst multiple sterilization writers.

3. The Serialization Writers 206, 208, 210, 206', 208', 210'—A sophisticated piece of machinery that performs the actual application of a serial number (i.e., serialization) to, e.g., the BCA field of a DVD on a production line. There are two known types of BCA writers from Panasonic and Robi Systems. These writers, typically, can apply the BCA mark at line speeds (3–4 seconds per disc). The BCA writers communicate with the replication facility host 104, 104' using TCP/IP over an Ethernet connection. The present document does not discuss the BCA writers other than how they interface to the replication facility host 104, 104', as such BCA writers are well known in the art.

Figure 3:
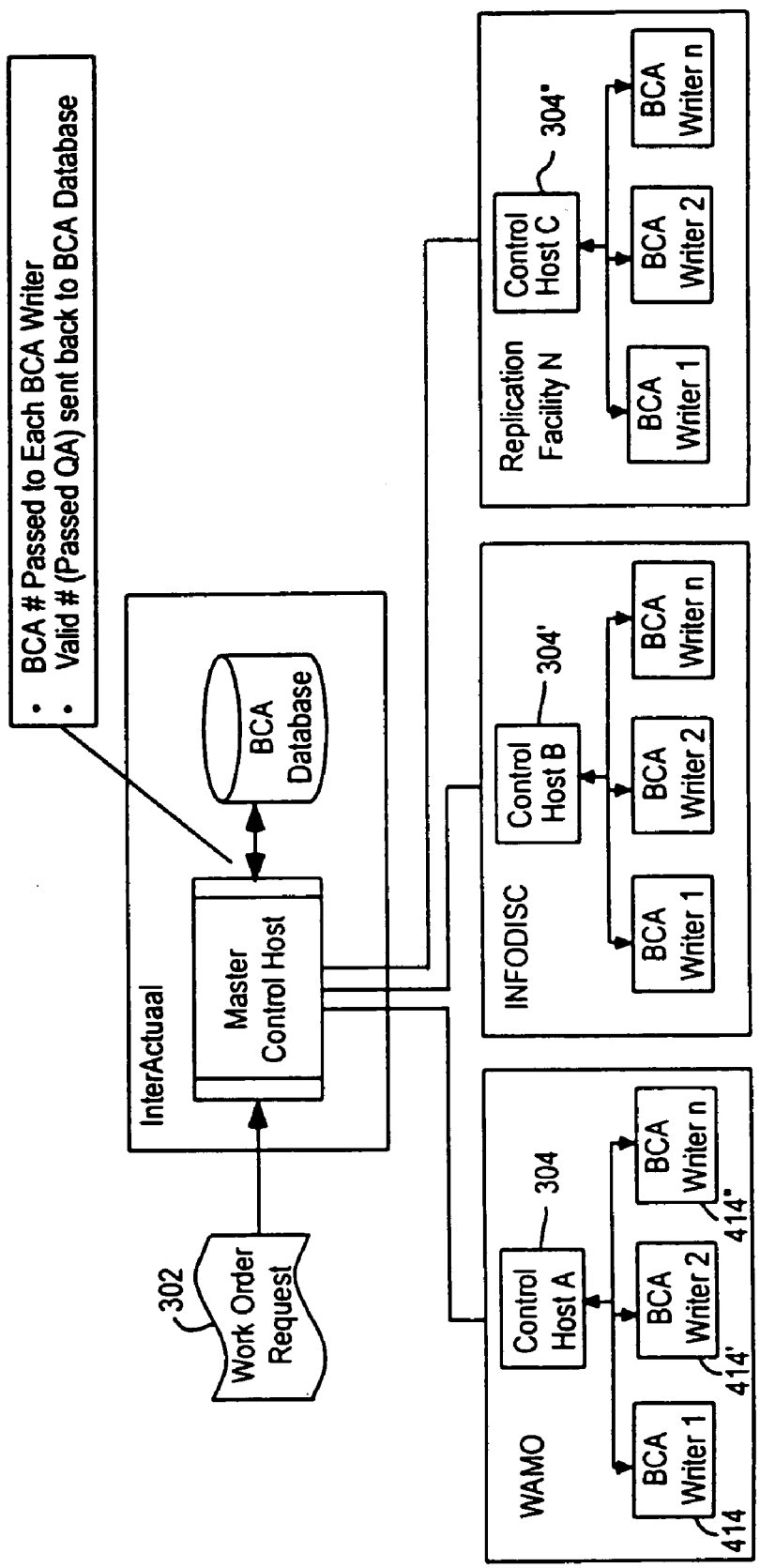
FIG. 3 is high-level block diagram illustrating workflow in a BCA writer serialization management system, such as in FIG. 1.
Figure 4:
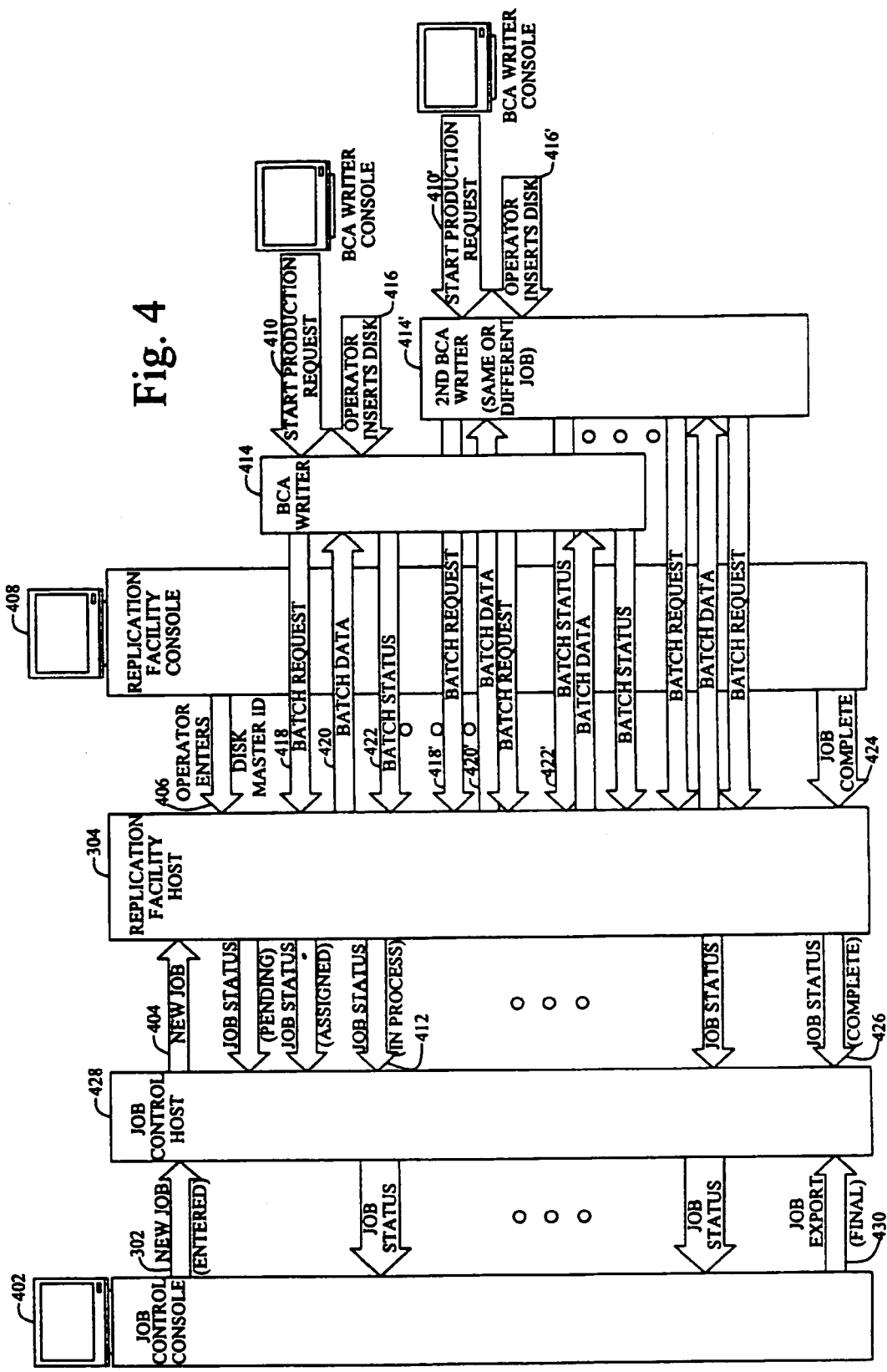
FIG. 4 is a work flow diagram illustrating steps traversed by a BCA writer serialization management system such as in FIG. 1.

Referring next to FIG. 3, a high-level block diagram is shown illustrating workflow in the serialization writer serialization management system, and simultaneously referring to FIG. 4, a work flow diagram is shown illustrating steps traversed by the BCA writer serialization management system. These diagrams illustrate a typical flow of a job through the serialization and control system. Time is indicated vertically in FIG. 4 and flows from the top to the bottom (i.e., later-occurring events are depicted below earlier-occurring events).

1. At the outset a new production job 302 is created at a job control console 402—job status entered 2. The job 404 is transferred to a replication facility host 304—job status pending 3. Operator assigns 406 a disk master ID for the job on the replication facility host console 408—job status assigned 4. The following steps repeat until the job is marked complete by an operator:

4.1. A BCA machine operator initializes 410, 410' a serialization production run on a BCA writer 414, 414', 4.1.1. If this is the first serialization run for a job, job status becomes in process, 4.2. The BCA machine operator inserts disks 416, 416' in BCA writer 414, 414' and issues a command to start producing disks for a given job, 4.3. The following steps repeat until the BCA machine operator terminates the serialization production run:

4.3.1. The BCA writer requests a batch 418, 418' of serialization data for the job from the replication facility host 304 and receives batch data 420, 420' from the replication facility host 304, 4.3.2. The BCA writer 414, 414' writes serialization data onto disks, and 4.3.3. As batches complete, the BCA writer 414, 414' notifies the replication facility host 304 and sends the status 422, 422'. Two batches of 16 serial numbers are always in process per BCA writer, 5. The BCA writer operator marks a disk master ID as complete for each complete job on the replication facility host console 408, 6. The replication facility host 408 notifies 424 the job control host that the job is completed 426—job status complete 7. When confirmation is received from the job control host 428 the job is deleted from the replication facility host 304

8. The job is exported from the job control console 430—job status final.

The job control host 428 of the present embodiment includes a collection of Windows NT tasks that collectively implement the job control host function. The user interface for the job control host 428 is a windows based interface.

The Windows NT task that implements the user interface for the job control host 428 is used to manage and display the status of production jobs.

Figure 5:
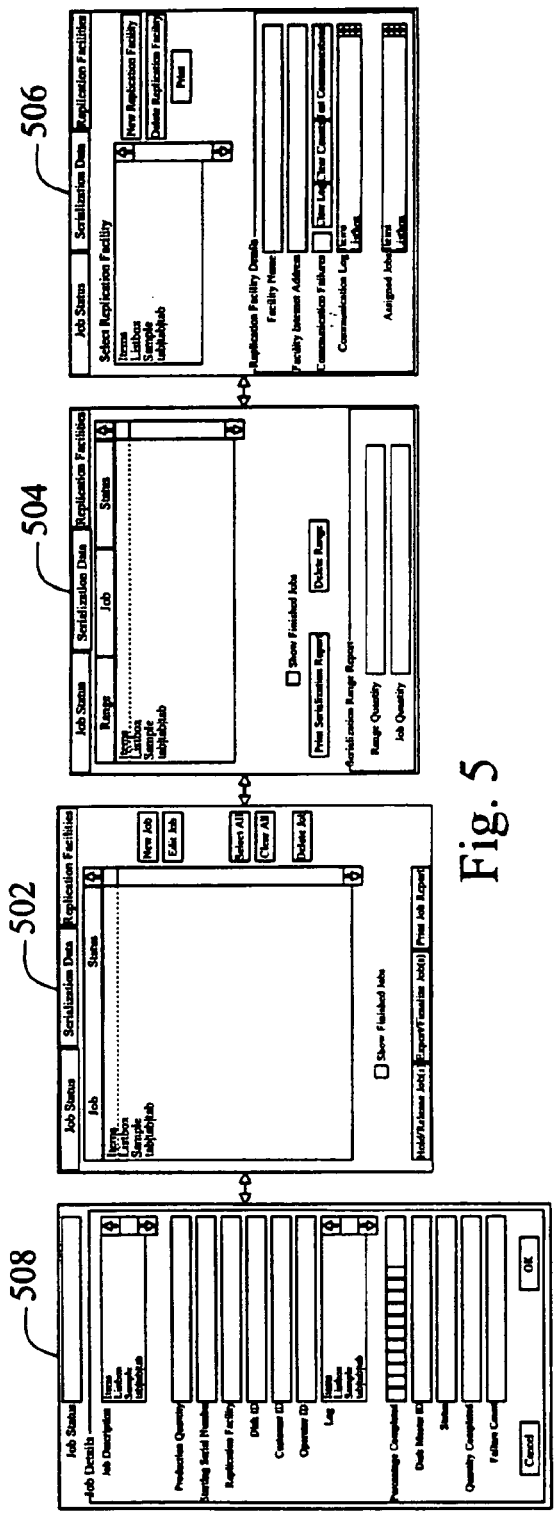
FIG. 5 is block diagram illustrating display screens for a console of a job control host of the BCA writer serialization management system of FIG. 1, and navigational relationships between such display screens.

Referring to FIG. 5, a block diagram is shown illustrating display screens for a console of a job control host of the serialization writer serialization management system, and navigational relationships between such display screens. The console has three main screens: Job Status 502, Serialization Data 504, and Replication Facilities 506. The three main screens are accessed by tabs at the top of each of the three main screens.

The Job Status screen 502 has an additional sub-screen, Edit Job 508, which is accessed by clicking a New Job or Edit Job button on the Job Status screen.

Figure 6:
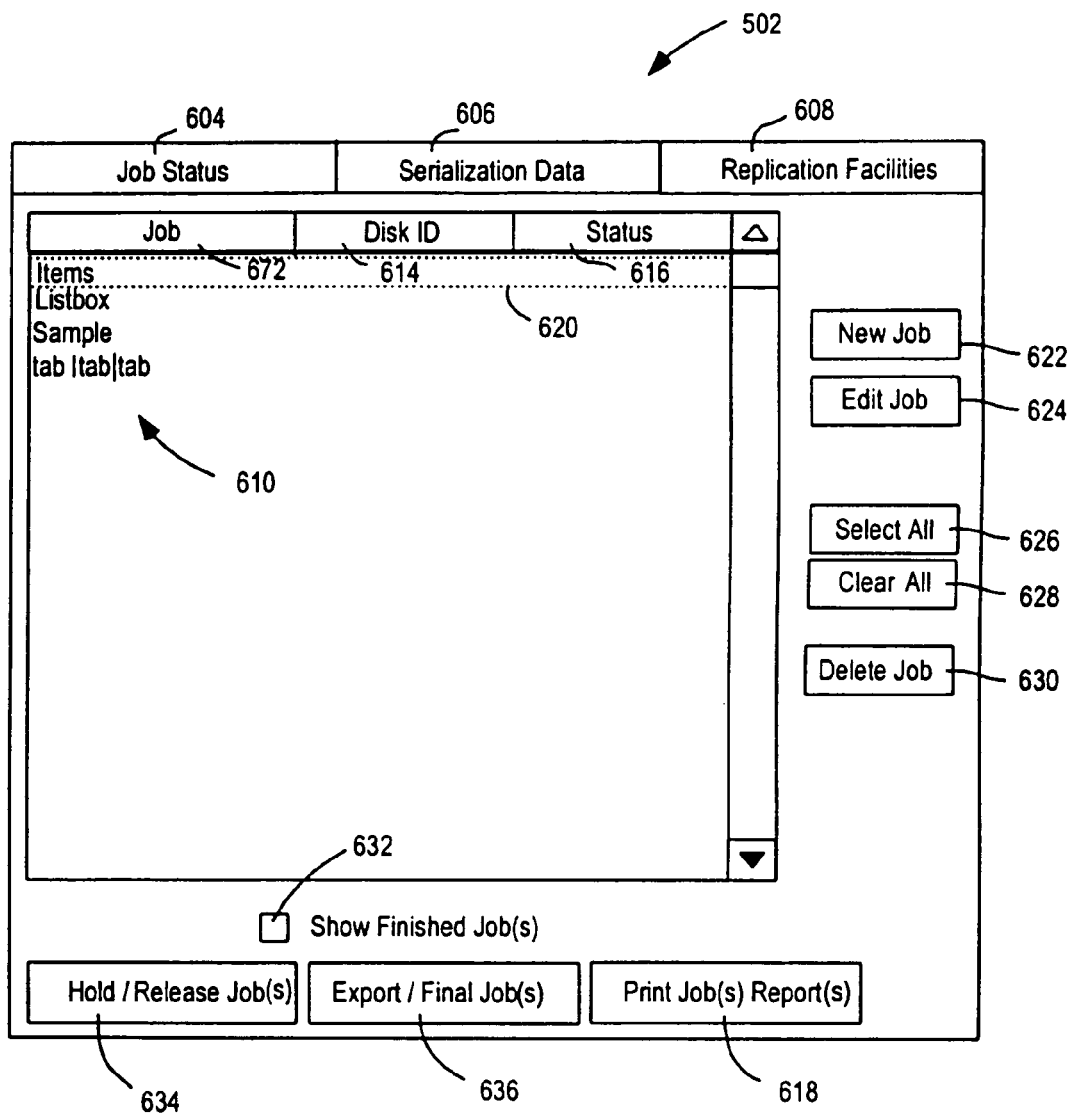
FIG. 6 is an illustration of a job status display screen for the console of the job control host of the BCA writer serialization management system of FIG. 1.

Referring to FIG. 6, an illustration is shown of a job status screen 502 for the console of a job control host of the serialization writer serialization management system. This is the main screen for all Job management. From here the operator is able to create, assign, track, and finalize jobs. This screen provides an overview of the current Job status, and provides convenient mechanisms for all Job management functions.

| | |
|---|---|
| Job Status 504, Serialization Data 506, Replication Facilities 508 tabs | Clicking on one of these tabs brings the Job Status, Serialization Data, or Replication Facilities screen forward. |
| Job/Disk ID/ Status List 510 | Contains a list of production jobs in the system, and each jobs Disk ID and Status. The jobs may be sorted by clicking on the Job 512, Disk ID 514, or Status 516 column headings. Buttons such as Print Job Report 518 operate on the jobs selected in this list. Double-clicking on a job brings up the Edit Job screen. |

-continued

| | |
|---|---|
| New Job 522 | Creates a new job and brings up the Edit Job window. |
| Edit Job 524 | Brings up the Edit Job window. |
| Select All 526 | Selects all the jobs in the list. |
| Clear All 528 | Clears all the jobs in the list. |
| Delete Job 530 | Clicking deletes the selected job. A confirm dialog box will appear. A job can only be deleted if its status is Pending or Hold. Deleted jobs are not really deleted, but rather are finalized and will no longer appear as active jobs in the jobs screen. Thus if any serial numbers have been used (i.e. applied to a disc) the job will remain in the job database to allow for duplicate serial number checking. |
| Show Finalized Jobs 532 | Displays a list of finalized jobs in the job list area. A finalized job has completed production and has had its serialized data exported. |
| Hold/Release Job(s) 534 | Clicking puts all selected job(s) on Hold. A confirmation with a dialog box will appear. Any job may be placed on hold, although until the hold has been confirmed by the replication facility, status will only show hold pending. The hold will not become effective at the replication facility until any active BCA marking session is complete. Once on hold, a job can be released at which time its status will become Assigned. |
| Export/Finalize Job(s) 536 | Exports the serialization data for the selected job(s) and mark the job as finalized. The exported file is in a comma separated value (CSV) format. |
| Print Job Report 518 | Prints a report of the selected job(s). |

Figure 7:
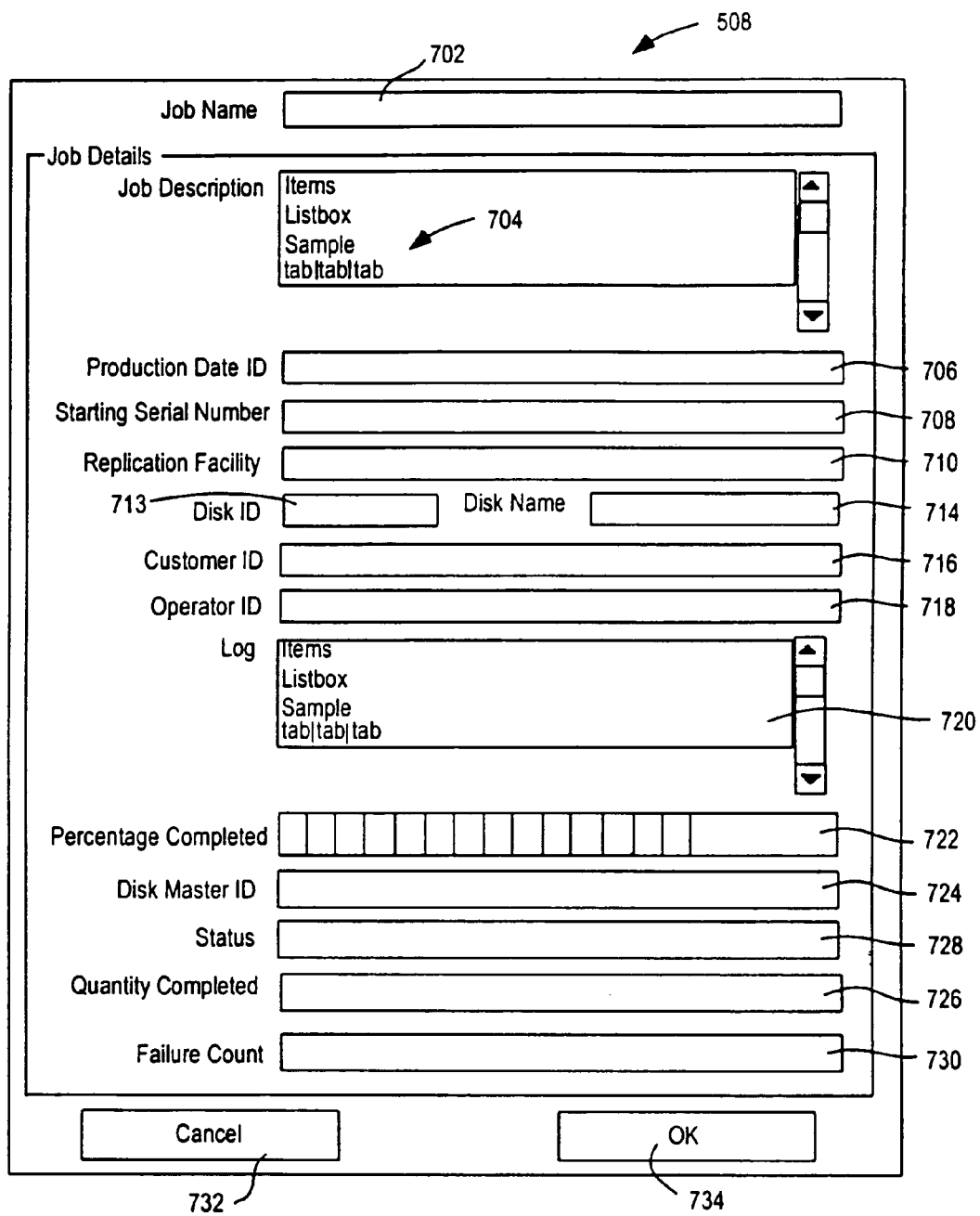
FIG. 7 is an illustration of an edit jobs display screen for the console of the job control host of the BCA writer serialization management system of FIG. 1.

Referring to FIG. 7, an illustration is shown of an edit job screen 508 for the console of a job control host of the serialization writer serialization management system. This is the screen used to add or edit jobs. Jobs can only be entered when all information is available. Jobs may only be edited before the replication facility assigns a disk master ID and their status becomes Assigned.

| | |
|---|---|
| Job Name 702 | The name assigned to the job being created/edited. This is the name/ID that will be used by the replication facilities to identify the appropriate disc master ID. An error will occur if the name is not unique. Once a jobs status has become Assigned this field will no longer be editable. |
| Job Description 704 | A Description of the current job. |
| Production Quantity 706 | Indicates the quantity to be produced. The quantity to be produced should be enough to allow for normal production overage and waste. Once a job's status has become Assigned this field will no longer be editable. |
| Starting Serial Number 708 | The starting serial number of the job. A block of sequential serial numbers will be reserved for this job starting at this number and continuing through the quantity being produced. An error will occur if another |

| | |
|---|---|
| | job has already been assigned a conflicting serial number range. (Note that a default serial number, such as the next unused number, is not displayed because the Job Management task has no knowledge of how patterns of serial number ranges are assigned.) Once a jobs status has become Assigned this field will no longer be editable. |
| Replication Facility 710 | The replication facility that will be assigned to produce this job. Once a jobs status has become Assigned this field will no longer be editable. |
| Disk ID 712 | A unique numeric disc identifier assigned by InterActual. Once a job's status has become Assigned this field will no longer be editable. |
| Disk Name 714 | A unique textual disc identifier assigned by InterActual associated with the Disk ID. This field will automatically be filled out and a warning issued if the entered Disk ID has already been used in another job. Once a job's status has become Assigned this field will no longer be editable. |
| Customer ID 716 | The ID of the customer this job is being produced for. |
| Operator ID 718 | The Operator ID of the operator who is entering the new job. The user's login name is used as the operator ID and is not editable. |
| Log 720 | A log of events pertaining to this job. The date and time when jobs are entered or edited, status changes, errors, etc. appear in the log. Information pertinent to the event, such as operator ID, is also logged. |
| Percentage Completed 722 | Graphical representation of the percentage completion of the job. |
| Disk Master ID 724 | Master ID for the job. New jobs are Pending until a Disk Master ID is entered by the operator at the Replication Facility. Once it is entered the Job Control Host is notified and the job status becomes Assigned. |
| Quantity Completed 726 | The number of disks in the current job that have been produced by the replication facility. |
| Status 728 | The current status of this job. |
| Failure Count 730 | The number of failed serial numbers in this job. |
| Cancel 732 | Cancels adding the new job. |
| Submit Job 734 | Submits the new job for production. |

Figure 8:
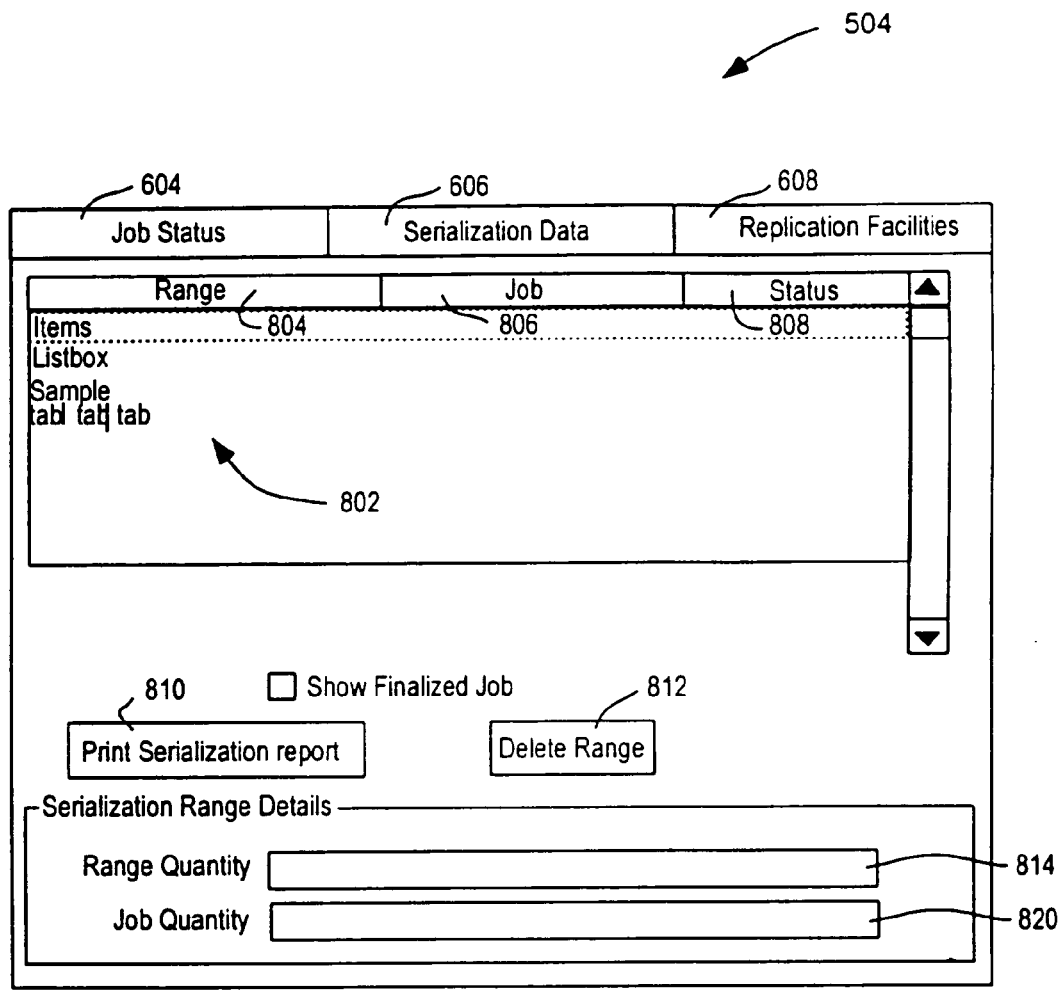
FIG. 8 is an illustration of a serialization data display screen for the console of the job control host of the BCA writer serialization management system of FIG. 1.

Referring to FIG. 8, an illustration is shown of a serialization data display screen for the console of a job control host of the BCA writer serialization management system. This screen allows the operator to review the serial number set under management. The operator can view serial number utilization in sequential order or by status. In addition, the serial number data can be written to a file or printed. Note that only the export file will contain the full BCA mark data, including the appropriate authentication signatures.

| | |
|---|---|
| Job Status 504, Serialization Data 606, Replication Facilities 608 tabs | Clicking on one of these tabs brings, respectively, the Job Status, Serialization Data, or Replication Facilities screen forward. |
| Serialization Ranges 802 | Lists the serial number ranges of all jobs, the job the range is contained in, and the status of each range. The status of each range can be In Process, Good, or Bad. Multiple ranges may be selected for the export command. The ranges may be sorted by clicking on the Range 804, Job 806 or Status 808 column headings. Double-clicking on a range switches to the job screen positioned to the job the range is contained in. |
| Print Serialization Report 810 | Prints a report of the selected serialization ranges. |
| Delete Range 812 | Deletes the selected range. |
| Range Quantity 814 | The number of serial numbers in the selected range. |
| Job Quantity 820 | The number of disks in the job of which this serial number is part of. |

Figure 9:
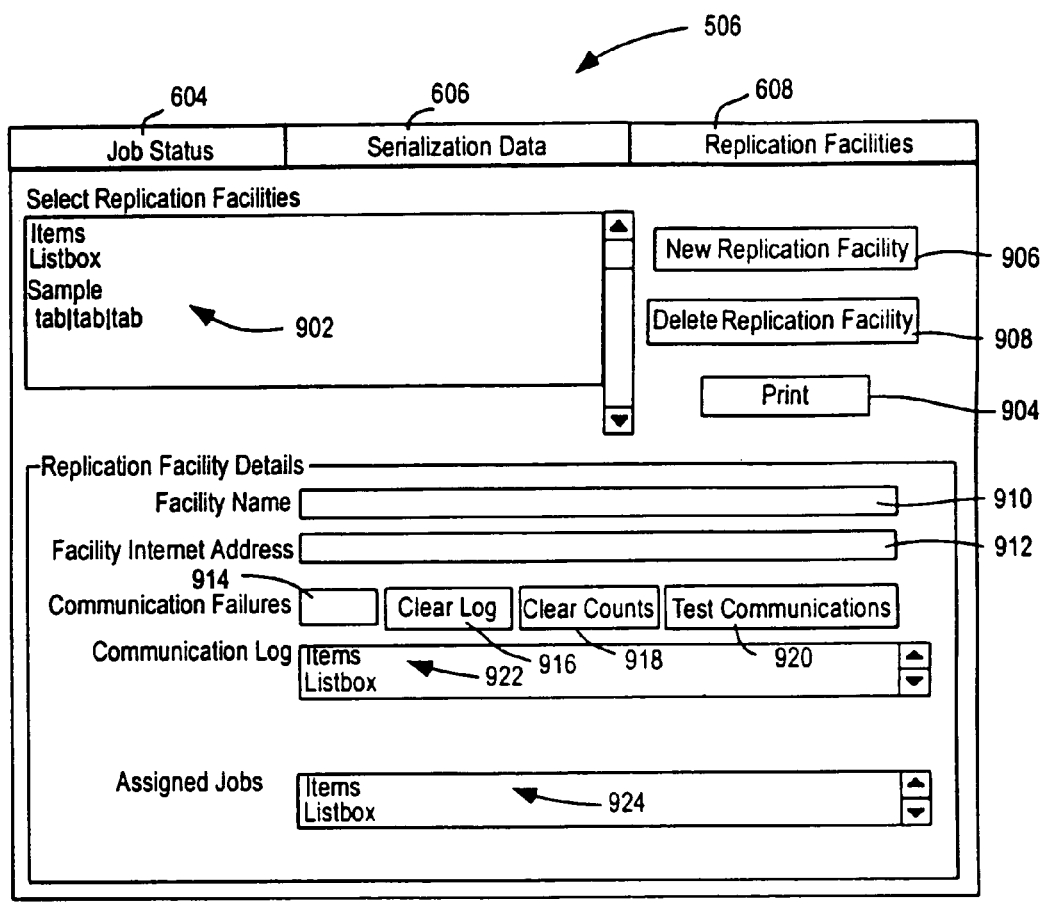
FIG. 9 is an illustration of a replication facilities maintenance and status display screen for the console of the job control host of the BCA writer serialization management system of FIG. 1.

Referring to FIG. 9, an illustration is shown of a replication facilities maintenance and status display screen 506 for the console of a job control host of the serialization writer serialization management system. This is the main screen for replication facility maintenance and status overviews. From here the operator is able to create, delete, and track replication facility host connections.

| | |
|---|---|
| Job Status 604, Serialization Data 606, Replication Facilities 608 tabs | Clicking on one of these tabs brings the Job Status. Serialization Data, or Replication Facilities screen forward. |
| Replication Facilities 900 | Lists all replication facilities. Multiple replication facilities may be selected for the print 904 command. |
| New Replication Facility 906 | Adds a new replication facility to the list. |
| Delete Replication Facility 908 | Deletes the selected replication facility. A confirm dialog will appear. The replication facility cannot be deleted if it has any currently assigned jobs. They must first be placed on Hold and/or Finalized. |
| Print 904 | Prints a report of the selected replication facilities. |
| Facility Name Name 910 | Name of the selected replication facility. |
| Facility Internet Address 912 | Internet address of the selected replication facility. |
| Communication Failures 914 | The count of the communication failures to the selected replication facility. Details of each failure appear in the communications log. |
| Clear Log 916 | Clears the communication log for the selected replication facility. |
| Clear Counts 918 | Clears the communication failure count field for the selected replication |

-continued

| | facility. |
|---|---|
| Test Communications 920 | Tests communications to the selected replication facility. The results of the test appear in the communication log. |
| Communication Log 922 | Log of all communication between the job control host and the selected replication facility host. |
| Assigned Jobs 924 | List of jobs currently assigned to the selected replication facility. Only jobs assigned by this Job Control Host are shown Double clicking on a job in the assigned jobs window automatically brings up the Job status screen. |

Figure 10:
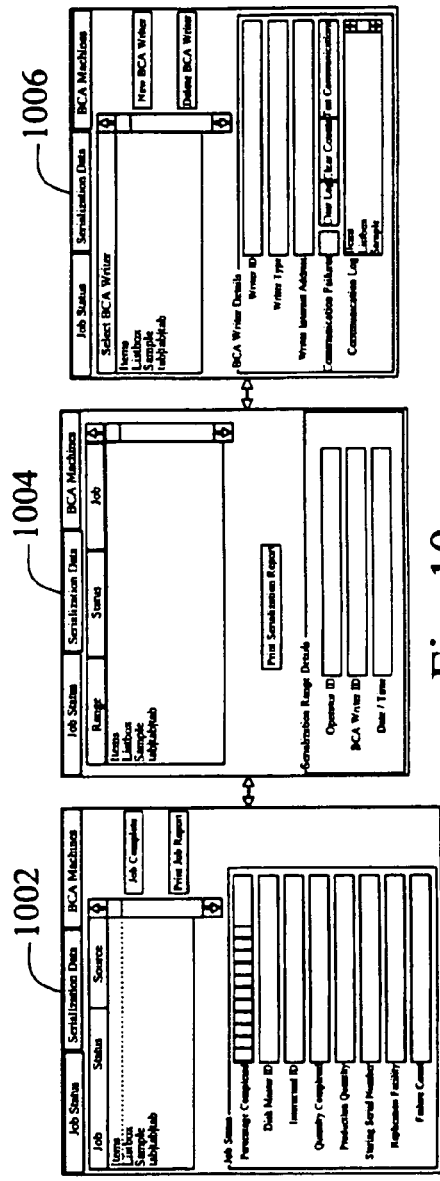
FIG. 10 is block diagram illustrating display screen for a console of a job control host of the BCA writer serialization management system of FIG. 1, and navigational relationships between such display screens.

Referring to FIG. 10, a block diagram is shown illustrating display screens for a console of a job control host of the serialization writer serialization management system, and navigational relationships between such display screens. Thus, the console of the replication facility host has three main screens: replication facility job status 1002, serialization data 1004, and BCA writer maintenance and status 1006. The three main screens are accessed by tabs at the top of each of the three main screens.

Figure 11:
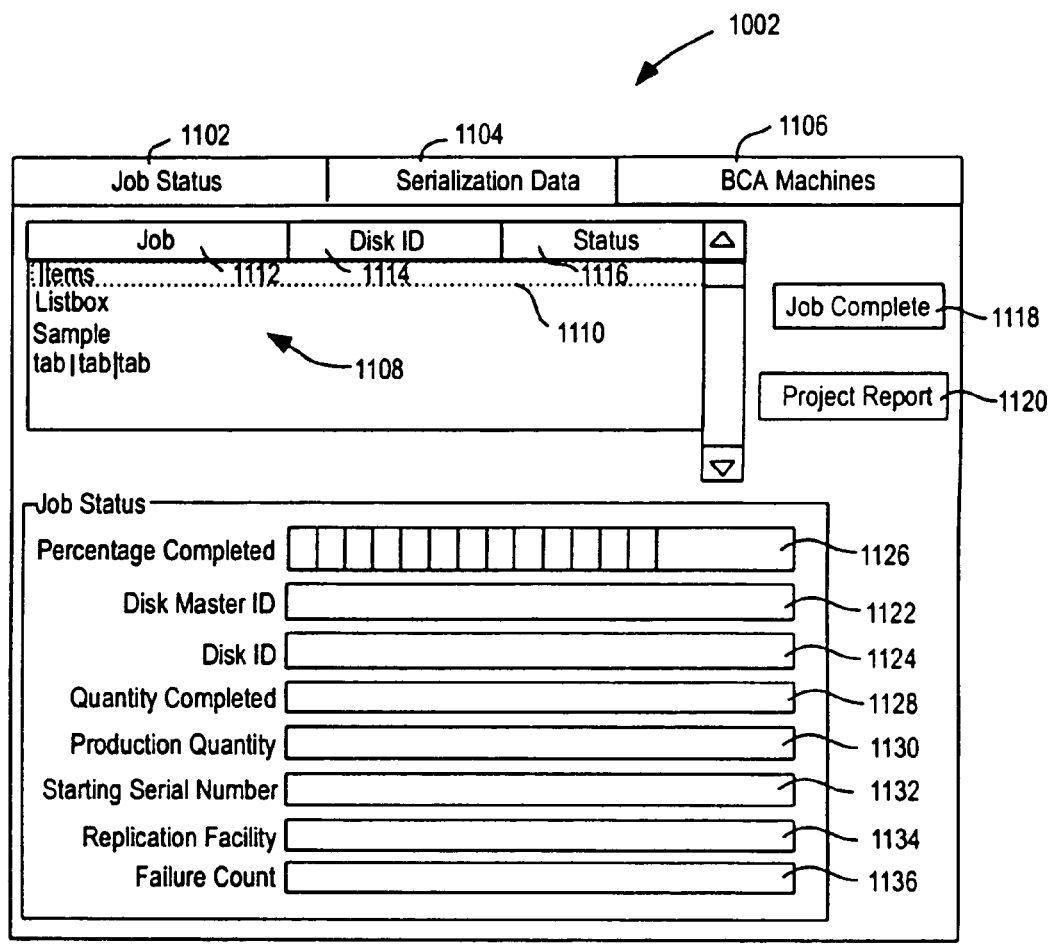
FIG. 11 is an illustration of a replication facility job status display screen for the console of the replication facility host of the BCA writer serialization management system of FIG. 1.

Referring to FIG. 11, an illustration is shown of a replication facility job status display screen 1002 for the console of a replication facility host of the BCA writer serialization management system. The replication facility job status display screen is used for keeping track of jobs sent to all replication facilities. A job is entered after a serial number range, job ID, and replication facility are known. Once the job is entered it is automatically downloaded to a replication facility host at a replication facility. Control of the job is then passed to the replication facility host. The replication facility host periodically sends a status update the job control host including job statuses (see below) for each job that has been sent to, and is being handled at, the replication facility of the replication facility host. The job control host may request status changes, but the replication facility host actively manages and controls the job.

Once the job is marked complete by the replication facility host, control of that job is passed back up the job control host, where the operator is responsible for performing a finalize operation which results in an export of the final serial number data and status.

In accordance with the present embodiment, once entered, jobs may not be edited. This is due to the fact that in normal operations the jobs will quickly be downloaded to the replication facility host, and once downloaded, control of that job is passed to the replication facility host. Thus, if a job has errors and needs to be corrected, it should be placed on hold status when it is initially entered, then deleted/finalized, and then taken off of hold status. Any used serial numbers from hold/deleted jobs are not reused.

As also noted above, job statuses are:

ENTERED—The job has been defined, but not downloaded to its replication facility host.

PENDING—The job has been downloaded to the replication facility host but no data has been received in a status update or in response to a status change request indicating that the serialization of the job has begun.

ASSIGNED—The job has been assigned a disc master ID by the replication facility host, but serialization has not yet begun.

INPROCESS—Serialization of the job has begun, but an indication that the job is complete has not yet been received.

COMPLETE—The replication facility host has marked the job as completed.

FINALIZED—Recordation/storing of completed serial number data has been performed, such as by saving the completed serial number data in a file.

HOLDPENDING—A Hold of the job has been requested, but not yet acknowledged by the replication facility host. This status is used when a particular job needs to be cancelled or work held for some reason, and a request to hold such job had been made at the job control host, but not yet acknowledged by the replication facility host.

HOLD—The job has been placed on hold in the replication facility host.

Jobs are preferably exported in a comma separated value (CSV) format suitable for importing into programs such as Microsoft Excel, or into a serialization database, such as a Microsoft Access database, or an Oracle Database. Each job is exported into a separate file, i.e., a separate comma separated value file.

A first line of the comma separated value file contains information pertaining to the overall job including the Job Name, Job Status, Replication Facility, disk identifier (e.g., an InterActual disk identifier), Disk Master ID, Production Quantity, Quantity Completed, and Job Control Host Operator ID. Subsequent lines each contain information for one serialization range including the fields Starting Serial Number, Status, Quantity, BCA writer operator ID, BCA writer ID, starting date/time, and ending date/time.

A job control database, such as a Microsoft Access or Oracle database, contains data relating to all production jobs in the system such as serialization information, assigned replication facilities, job quantities, job status, etc.

A format for the job control database is as follows:

Job Database Format

| Field Name | Field Type | Example |
|---|---|---|
| Job Name | String | Herndon, |
| Production Quantity | 32-bit integer | 50000, |
| Replication Facility | String | WAMO, Olyphant PA |
| Starting Serial Number | 32-bit integer | 100 |
| Number of Units assigned | 32-bit integer | Number of units which have been assigned to this Job at job creation |
| Job Status | String | In Process |
| Description | String | Matrix, special feature—Warner Brothers. |
| Date/time created | Time (32-bit integer-sec. since 1980?) | Dec 10, 2000 4:15 PM |
| Date/time downloaded to replication facility | Time | Dec 10, 2000 10:37 PM |
| First Serialization applied | Time | Dec 11, 2000 8:03 AM |
| Job Completed | Time | Dec 15, 2000 1:31 PM |
| Serial Number Range Count | 32-bit integer | 3 |
| Serial Number Start | Integer [ ] | 100, 724, 730 |
| Serial Number Quantity | Integer [ ] | 624, 6, 50100 |
| Serial Number Range Status | Integer [ ] | GOOD, BAD, Unknown |

The following is an explanation of the possible values for serial number range Status:

Good—Disks in this range were successfully produced

Bad—Disks in this range were bad

Unknown—Disks in this range have an unknown status, serial number assigned to replication machine, but results undefined. These serial numbers may appear in the field.

All other serial numbers in the assigned range, but without detailed records are assumed to be unknown until the job status is Closed, at which time they are given the status Assigned.

A database of all known replication facilities, i.e., a replication facilities database, is also maintained at the job control host. In accordance with the present embodiment, the replication facilities database is a simple text file having one replication facility per line. Each line contains the following fields separated by commas:

| Replication Facility Database Format | | |
|---|---|---|
| Field Name | Field Type | Example |
| ID | String | Herndon |
| Internet address | String | herndon.xyzzy.com |
| Date/time Created | TIME | Oct 5, 2000 11:05 am |

As mentioned above, a replication facility host is a Linux based personal computer that is optimized for high availability (HA) operation, such as by having redundant systems, such as hard drives, power supplies, interface cards, processors, etc. The replication facility host is responsible for providing real-time management for a group of BCA writers that do the actual writing of BCA's to discs.

The principle task of the replication facility host is to keep track of jobs currently under production and assigning new production batches to each BCA writer as batch requests are received from the job control host.

The following summarizes the various job control commands that the replication facility host may receive from the job control host via the network:

| Job Control Commands (received from Job Control Hosts) | | |
|---|---|---|
| Add Job | Add a new production job | |
| | Replication Facility ID | String | ID of Replication Facility assigned to this Job |
| | Job ID | String | ID of this job |
| | Production Quantity | Integer | |
| | Serial number format | String | ??? SN%d |
| | Starting Serial Number | Integer | |
| Delete Job | Delete an existing production job | |
| | Replication Facility ID | String | ID of Replication Facility assigned to this job. |
| | Job ID | String | ID of this job. |
| Hold Job | Hold an existing production job | |
| | Replication Facility ID | String | ID of Replication Facility assigned to this job. |
| | Job ID | String | ID of this job. |

| -continued | | |
|---|---|---|
| Job Control Commands (received from Job Control Hosts) | | |
| Continue Job | Continue an existing stopped production job | |
| | Replication Facility ID | String | ID of Replication Facility assigned to this Job |
| | Job ID | String | |
| Batch Commands (received from BCA Writer Interfaces)—see BCA Writer Interface | | |

A Job/Batch Console/Replication Job Management Task provides a user interface for the replication facility host. The console allows the operator of the replication facility host to assign and monitor jobs and BCA writers. The operator of the console is typically a back-office employee who has operational oversight of the overall job processes flow.

The Job/Batch Console/Replication Job Management Task has three main screens that are displayed on the replication facility host console: Job Status, Serialization Data 1104, and BCA Machines 1106. In accordance with the present embodiment, these three main screens are accessed by tabs at a top of each of the three main screens.

The Job Status display screen has the following:

| | |
|---|---|
| Job Status 1102, Serialization Data 1104, BCA Machines 1106 tabs | Clicking on one of these tabs brings the Job Status, Serialization Data, or BCA Machines screen forward. |
| Job Listing 1108 | Contains a list of production jobs at this replication facility, their status, and their source (the Job Control Host that assigned the job). Selecting 1110 a job will cause its status to be displayed in the Job Status portion of the window. Multiple jobs may be selected for the print command. The jobs may be sorted by clicking on the Job 1112, Status 1114 or Source 1116 column headings. Double-clicking on a job to switches to the serialization screen positioned to that jobs serialization data. |
| Job Complete 1118 | Clicking after all disks are produced indicates a job is complete. The Job Control Host is notified and when an acknowledgement is received the job is deleted from the Replication Facility Host. |
| Print Job Report 1120 | Prints a report of the selected job(s). |
| Disk Master ID 1122 | ID for disk being serialized. New jobs are Pending until a Disk Master ID is entered by the operator at the Replication Facility. Once it is entered the Job Control Host is notified and the job status becomes Assigned. Once the serialization has begun the Disk Master ID can no longer be changed. The Disk Master ID does not have to be unique. It is used by the replication facility to identify the disk being serialized and may apply to multiple jobs. For example, if the production quantity of a disk increases, a new job may be added for the additional quantity. A warning will be issued when this occurs. When multiple jobs with the same Disk Master ID exist they are treated as a single job from the point of view of |

-continued

| | |
|---|---|
| | the BOA writer operator—when the serial numbers from one job are exhausted the serial numbers from the next job will be used. The jobs are processed in the order entered (the oldest first). |
| InterActual Disk ID 1124 | A unique disc identifier assigned by a management entity, for example, InterActual. |
| Percentage Completed 1126 | The completion percentage of the selected job. |
| Quantity Completed 1128 | The number of disks in the selected job that have been produced by the replication facility. |
| Production Quantity 1130 | The total number of disks to be produced in this job. |
| Starting Serial Number 1132 | The starting serial number for this job. The serial numbers for this job are sequential starting at this number. |
| Job Source 1134 | The name of the Job Control Host from which this Job originated. |
| Failure Count 1136 | The number of failed serial numbers in this job. |

Figure 12:
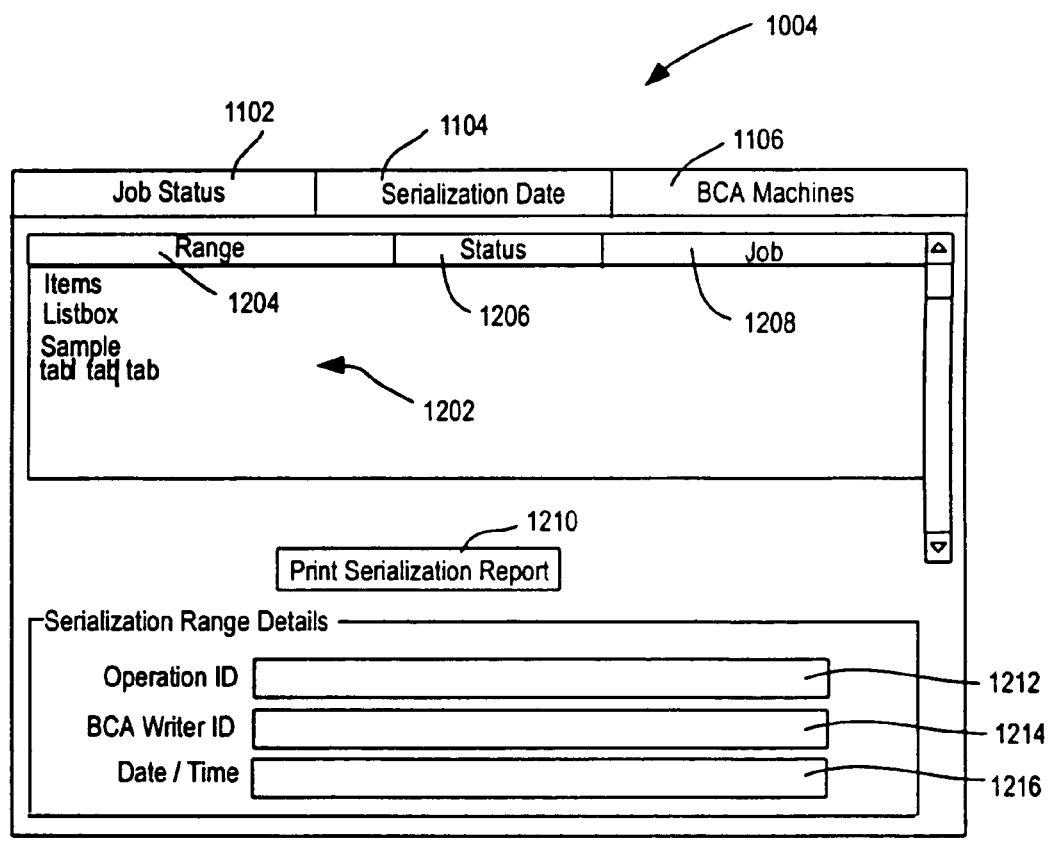
FIG. 12 is an illustration of a serialization data display screen for the console of the replication facility host of the BCA writer serialization management system of FIG. 1.

Referring to FIG. 12, an illustration is shown of a serialization data display screen 1004 for the console of a replication facility host of the BCA writer serialization management system.

A serialization management screen includes the following features:

| | |
|---|---|
| Job Status 1102, Serialization Data 1104, BCA Machines 1106 tabs | Clicking on one of these tabs brings the Job Status, Serialization Data, or BCA Machines screen forward. |
| Serialization Range list 1202 | Lists the serial number ranges of all jobs at this replication facility, and the status of each range. The status of each range can be In Process, Good, or Bad. Multiple ranges may be selected for the print command. The ranges may be sorted by clicking on the Range 1204, Status 1206, or Job 1208 column headings. Double-clicking on a range switches to the BCA writer screen positioned to the BCA writer producing the range. |
| Print Serialization Report 1210 | Prints a report of the selected serialization range(s). |
| Operator ID 1212 | The ID of the operator who was running the BCA machine when the selected range of disks was produced. |
| BCA Writer ID 1214 | The ID of the BCA machine that produced the selected range of disks. |
| Write_time 1216 | Date/Time that this range was begun. |
| Job ID | The ID of the job for which the selected range is a part. |

Figure 13:
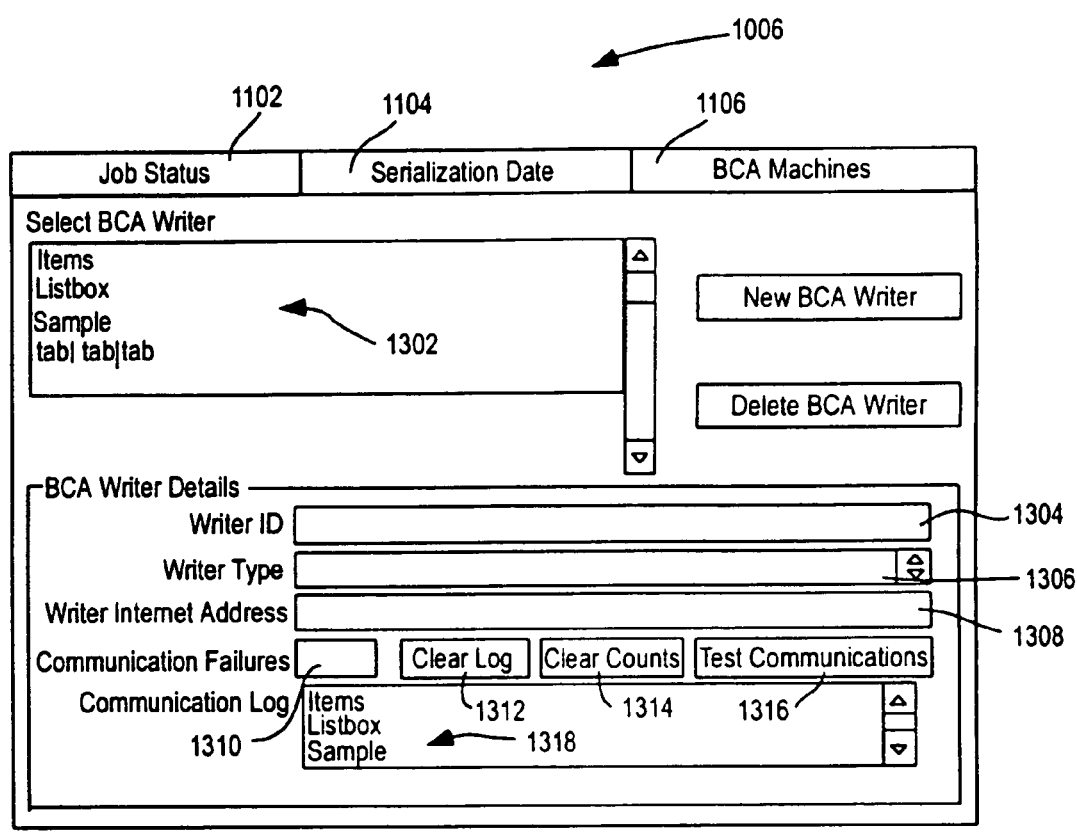
FIG. 13 is an illustration of a BCA writers maintenance and status display screen for the console of the replication facility host of the BCA writer serialization management system of FIG. 1.

Referring to FIG. 13, A BCA Machine Screen is the primary monitoring screen for the BCA machines associated with a replication Host. The BCA Machine Screen allows individual BCA writer statuses to be viewed as well as associated jobs. The BCA writer screen includes the following features:

| | |
|---|---|
| Job Status 1102, Serialization Data 1104, BCA Machines 1106 tabs | Clicking on one of these tabs brings the Job Status 1002, Serialization Data 1004, or BCA Machines 1006 screen forward. |
| BCA Writer List 1302 | A list of all the BCA writers at this replication facility. Selecting a BCA writer in the list will display detailed information about it in the Replication Facility Details portion of the window. |
| Writer ID 1304 | The ID or name of the selected BCA writer. |
| Writer Type 1306 | The type of the BCA writer (currently Robi or Panasonic). |
| Writer Internet Address 1308 | The internet address of the BCA writer. The format should be in either a TCP/IP address format (192.168.100.1) or another format (panasonic4.herndon.interactual.com) |
| Communication Failures 1310 | Count of the communication failures to the selected BCA writer. Details of each failure appear in the communications log. |
| Clear Log 1312 | Clear the communication log for the selected replication facility. |
| Clear Counts 1314 | Clear communication failure count field for the selected BCA writer. |
| Test Communications 1316 | Tests communications to the selected BCA writer. The results of the test appear in the communication log. |
| Communication Log 1318 | Log of all communication between the job control host and the selected BCA writer. |

A job control host database is maintained by each replication facility host. The job control host database is a database of all known Job Control Hosts either remote or local.

Job Control Host Database Format

| Field Name | Field Type | Example |
|---|---|---|
| Job Control Host ID | String | Herndon |
| Internet address | String | herndon.xyzzy.com |
| Date/time Created | TIME | Oct 5, 2000 11:05 am |

A job/batch database is maintained by each replication facility host, and is a database of production jobs assigned to the replication facility host. The job/batch database contains the current state of each job, the number of batches each job contains, the number of batches already produced, etc.

Job/Batch Database Format

| Field Name | Field Type | Example |
|---|---|---|
| Same fields as Job Database in Job Control Host Job/Batch specific fields not sent to Job Control Host such as Operator ID | | |

A BCA writer database is maintained by each replication facility host and is a database of BCA Writers under control of the replication facility host. The BCA writer database includes the following:

BCA Writer Database Format

| Field Name | Field Type | Example |
|---|---|---|
| BCA Writer ID | String | Panasonic7 |
| Type | String | Panasonic |
| Internet Address | String | Panasonic7.herndon.xyzzy.com |

The following is a description of a preferred serial number structure. This structure supports multiple individual records. Each record immediately follows the previous one on single byte boundaries. The header for the overall BCA number contains a version number and length field for an entire BCA data set, the date and time of serialization, and the BCA writer used. Each individual record then contains an owner & length field, which are standard, followed by owner specific data.

| Field | Offset | Description | Size |
|---|---|---|---|
| HEADER | | | |
| Version | 0 | Version number of the overall structure | 1 |
| Length of BCA data | 1 | Length of this entire BCA data set in bytes | 1 |
| Date/Time | 2 | Date & Timestamp of actual serialization | 4 |
| Facility | 6 | Facility in which serialization was performed | 2 |
| BCA Writer | 2 | BCA machine on which BCA written | 2 |
| INDIVIDUAL RECORDS | | | |
| Owner ID | N + 0 | Source of record | 2 |
| Length | N + 2 | Length of this record, in bytes | 1 |
| Data | N + 3 | Variable depending on owner | r |

The company specific record is an example of one of the above individual records that contains overall information for company specific content, such as InterActual content, on the media, including sub data sets for each individual "title" on the media. Version 1 of the record contains no title specific sub-fields as no known data would exist and space is at a premium. Individual titles are sequential from the serial number of the first "title" on the disc (the serial number in the record). There is reserved space for title specific data in the field.

| INTERACTUAL SPECIFIC RECORD | | | SIZE |
|---|---|---|---|
| Owner ID | +0 | Set to 0x0001. | 2 |
| Length | N + 2 | Length of all InterActual sub-records. | 1 |
| Version | N + 3 | Version of the InterActual record- Initial 0x01. | 1 |
| Disc_ID | N + 4 | InterActual Disc identifier, unique by disc (collection of titles). | 3 |
| Number of titles | N + 5 | Number of InterActual titles on the disc. | 1 |
| Ser_Num | N + 8 | InterActual unique serial number across ALL InterActual titles. If multiple InterActual titles are on the disc this is the first one, and subsequent InterActual titles are incremented by one from this ID. | 6 |
| Signature | N + 14 | Signature field- signature is across ALL fields in the InterActual record. | 20 |

| | Disk 1 | Disk 2 | Disk 3 |
|---|---|---|---|
| Example with One Title | | | |
| Owner ID | 1 | 1 | 1 |
| Length | 34 | 34 | 34 |
| Version | 1 | 1 | 1 |
| Disc_ID | 1001 | 1001 | 1001 |
| Number of titles | 1 | 1 | 1 |
| Ser_Num | 780092 3 | 780092 4 | 780092 5 |
| Signature | xxx | xxx | xxx |
| Example with Three Titles | | | |
| Owner ID | 1 | 1 | 1 |
| Length | 34 | 34 | 34 |
| Version | 1 | 1 | 1 |
| Disc_ID | 1001 | 1001 | 1001 |
| Number of titles | 3 | 3 | 3 |
| Ser_Num | 120001 | 120004 | 120007 |
| Signature | xxx | xxx | xxx |

While the invention herein disclosed has been described by means of specific embodiments and applications thereof, numerous modifications and variations could be made thereto by those skilled in the art without departing from the scope of the invention set forth in the claims.

What is claimed is:

1. A serialization management system comprising:
 a job control host for assigning a serial number to a storage media, for updating information of the media from a database in a server, and for generating a job wherein batch data being a function of the job;
 a replication facility host communicatively coupled to the job control host, wherein the job control host communicates the job to the replication facility host; and
 a serialization writer communicatively coupled to the replication facility host, wherein the replication facility host controls the serialization writer in response to the job, and communicates status information to the job control host, wherein the serialization writer writes a first serialization onto a first side of the media in response to the batch data, and write a second serialization onto a second side of the media in response to the batch data.

2. The serialization management system of claim 1 wherein the serialization writer communicates a batch status to the replication facility host from time to time.

3. The serialization management system of claim 2 wherein the serialization writer communicates the batch status to the replication facility upon completion of the batch.

4. A serialization management system comprising:
a job control host for assigning serial numbers to storage media, for updating a database in a server, and for generating a job;
a replication facility host communicatively coupled to the job control host, wherein the job control host communicates the job to the replication facility host;
a serialization writer communicatively coupled to the replication facility host, wherein the replication facility host controls the serialization writer in response to the job, and communicates status information to the job control host;
a serialization writer console coupled to the serialization writer, the serialization writer console prompting the replication facility host for a batch having batch data by communicating a batch request to the replication facility host, the batch being initiated at the replication facility host and the job being initiated at the job control host; wherein the replication facility host communicates to the serialization writer, in response to the batch request to generate batch data, the batch data being generated by the replication facility host as a function of the job; and
a replication facility console communicatively coupled to the replication facility host for receiving a job complete indicia, and for communicating the job complete indicia to the replication facility host; wherein the replication facility host generates a job complete status in response to the job complete indicia, and further wherein the replication facility host communicates the job complete status to the job control host.

5. The serialization management system of claim 4 wherein the job control host generates a confirmation in response to the job complete status, and communicates a confirmation to the replication facility host in response thereto, the replication facility host deleting the job in response to the confirmation.

6. The serialization management system of claim 5 wherein the job control hosts exports the job in response to receipt of the job complete status.

7. A serialization management method comprising:
assigning a serial number to a storage media in a job control host;
updating information of the media from a database in a server;
generating a job in the job control host wherein batch data is a function of the job;
communicating the job to a replication facility host;
controlling a serialization writer in response to the job;
communicating status information to the job control host;
prompting the replication facility host for a batch having batch data by communicating a batch request to the replication facility host, the batch being initiated at the replication facility host and the job being initiated at the job control host;
generating batch data at the replication facility host as a function of the job;
communicating to the serialization writer, in response to the batch request, to generate the batch data; and
writing serialization onto media with the serialization writer in response to the batch data, wherein writing comprises writing a first serialization onto a first side of the media in response to the batch data, and writing a second serialization onto a second side of the media in response to the batch data.

8. The serialization management method of claim 7 further comprising:
communicating a batch status to the replication facility host from time to time.

9. The serialization management method of claim 8 further comprising:
communicating the batch status to the replication facility upon completion of the batch.

10. A serialization management method comprising:
assigning a serial number to a storage media in a job control host;
updating information of the media from a database in a server;
generating a job in the job control host wherein batch data is a function of the job;
communicating the job to a replication facility host;
controlling a serialization writer in response to the job;
communicating status information to the job control host;
prompting the replication facility host for a batch having batch data by communicating a batch request to the replication facility host, the batch being initiated at the replication facility host and the job being initiated at the job control host;
generating batch data at the replication facility host as a function of the job; communicating to the serialization writer, in response to the batch request, to generate the batch data;
writing serialization onto media with the serialization writer in response to the batch data;
receiving a job complete indicia at a replication facility console;
communicating the job complete indicia to the replication facility host;
generating a job complete status in the replication facility host in response to the job complete indicia; and
communicating the job complete status to the job control host.

11. The serialization management method of claim 10 comprising:
generating a confirmation in response to the job complete status;
communicating the confirmation to the replication facility host in response thereto; and
deleting the job at the replication facility host in response to the confirmation.

12. The serialization management method of claim 11 further comprising:
exporting the job in response to receipt of the job complete status.

* * * * *